`US010297155B2`

(12) United States Patent
Otsuka

(10) Patent No.: US 10,297,155 B2
(45) Date of Patent: May 21, 2019

(54) OBJECT DETECTOR

(71) Applicant: Hitachi Automotive Systems, Ltd., Hitachinaka-shi, Ibaraki (JP)

(72) Inventor: Yuji Otsuka, Hitachinaka (JP)

(73) Assignee: HITACHI AUTOMOTIVE SYSTEMS, LTD., Hitachinaka-shi (JP)

(*) Notice: Subject to any disclaimer, the term of this patent is extended or adjusted under 35 U.S.C. 154(b) by 149 days.

(21) Appl. No.: 15/024,937

(22) PCT Filed: Jun. 13, 2014

(86) PCT No.: PCT/JP2014/065676
§ 371 (c)(1),
(2) Date: Mar. 25, 2016

(87) PCT Pub. No.: WO2015/045504
PCT Pub. Date: Apr. 2, 2015

(65) Prior Publication Data
US 2016/0240085 A1 Aug. 18, 2016

(30) Foreign Application Priority Data

Sep. 27, 2013 (JP) .................................. 2013-201157

(51) Int. Cl.
*H04N 7/18* (2006.01)
*G08G 1/16* (2006.01)
(Continued)

(52) U.S. Cl.
CPC ......... *G08G 1/166* (2013.01); *G06K 9/00805* (2013.01); *G06K 9/00825* (2013.01);
(Continued)

(58) Field of Classification Search
CPC ............ G06K 9/00805; G06K 9/00825; G06T 2207/10024; G06T 2207/10028;
(Continued)

(56) References Cited

U.S. PATENT DOCUMENTS

2005/0036660 A1  2/2005 Otsuka et al.
2008/0278577 A1 11/2008 Otsuka et al.
(Continued)

FOREIGN PATENT DOCUMENTS

EP  2 549 457 A1  1/2013
JP  2005-92861 A   4/2005
(Continued)

OTHER PUBLICATIONS

Extended European Search Report issued in counterpart European Application No. 14847611.2 dated Apr. 24, 2017 (nine (9) pages).
(Continued)

*Primary Examiner* — Farzana Hossain
(74) *Attorney, Agent, or Firm* — Crowell & Moring LLP

(57) ABSTRACT

Provided is an object detector capable of suppressing any decrease in accuracy of object detection under a low illuminance environment such as nighttime or in tunnels, whereby suppressing a failure of Adaptive Cruise Control, pre-crash safety systems, and the like. The object detector includes: a distance information calculation unit 105 configured to calculate distance information to an object around a vehicle from an image captured by a plurality of imaging units 102, 103; an extraction unit 106 configured to extract at least an object existing in a long distance region away from the vehicle and having a specific color from among objects in the image based on the distance information; and an output unit 108 configured to output the distance information to the object having been extracted by the extraction unit 106.

7 Claims, 8 Drawing Sheets

(51) Int. Cl.
  *G06K 9/00* (2006.01)
  *H04N 5/243* (2006.01)
  *H04N 13/239* (2018.01)
(52) U.S. Cl.
  CPC ............. *G08G 1/167* (2013.01); *H04N 5/243* (2013.01); *H04N 13/239* (2018.05); *G06T 2207/10024* (2013.01); *G06T 2207/10028* (2013.01); *G06T 2207/30236* (2013.01); *G06T 2207/30261* (2013.01)
(58) Field of Classification Search
  CPC . G06T 2207/30236; G06T 2207/30261; G06T 7/73; G06T 7/90; G08G 1/166; G08G 1/167; H04N 13/239; H04N 5/243
  USPC ......................................................... 348/148
  See application file for complete search history.

(56) References Cited

U.S. PATENT DOCUMENTS

2012/0288146 A1* 11/2012 Kido .................. G06K 9/00805
                                                    382/103
2012/0288149 A1   11/2012 Kido
2012/0294481 A1   11/2012 Kasaoki
2013/0129150 A1*  5/2013 Saito ..................... G06K 9/46
                                                    382/104
2014/0293055 A1   10/2014 Otsuka

FOREIGN PATENT DOCUMENTS

| JP | 2008-298533 A | 12/2008 |
|----|---------------|---------|
| JP | 2010-224930 A | 10/2010 |
| JP | 2013-58829 A  | 3/2013  |
| JP | 2013-107476 A | 6/2013  |

OTHER PUBLICATIONS

International Search Report (PCT/ISA/210) issued in PCT Application No. PCT/JP2014/065676 dated Sep. 22, 2014 with English-language translation (four (4) pages).
Japanese-language Written Opinion (PCT/ISA/237) issued in PCT Application No. PCT/JP2014/065676 dated Sep. 22, 2014 (three (3) pages).

* cited by examiner

OBJECT DETECTOR

TECHNICAL FIELD

The present invention relates to an object detector, and in particular, relates to an object detector for detecting a preceding vehicle ahead of a vehicle under a low illuminance environment such as nighttime.

BACKGROUND ART

In an automobile field, for purposes of supporting driving, improving safety, and the like, various kinds of research and development have been made such as on an Adaptive Cruise Control (ACC) and pre-crash safety systems. The ACC and the pre-crash safety systems are techniques of capturing an image ahead of a vehicle with a stereo camera mounted on the vehicle, measuring a relative distance to a preceding vehicle from the captured image, and allowing the vehicle to follow the preceding vehicle or to brake predicting a collision against the preceding vehicle.

In a case where the relative distance to the preceding vehicle is measured from the image obtained with the stereo camera, the relative distance between the vehicles or the like is calculated by using parallax information of the same vehicle displayed on the images obtained with two imaging units (cameras). In recent years, downsizing of the stereo camera has been demanded in particular; however, there is a problem in that a decrease of a baseline length between the cameras constituting the stereo cameras results in a decrease of a detection distance. Accordingly, in a long distance region away from the vehicle, an image obtained with one of the cameras (monocular camera) constituting the stereo camera is used to detect a vehicle position from the image. The relative distance between the vehicles is calculated from width information (the number of pixels) on the detected image, an estimated vehicle width (for example, 1.7 m), and characteristics of the camera. In addition, a method for calculating the distance to the preceding vehicle is switched between a short distance region close to the vehicle and the long distance region away from the vehicle. In this way, accuracy of object detection around the vehicle is maintained (for example, PTL 1).

CITATION LIST

Patent Literature

PTL 1: Japanese Unexamined Patent Publication No. 2013-58829

SUMMARY OF INVENTION

Technical Problem

The object detection using the monocular camera, however, is difficult under the low illuminance environment such as nighttime or in tunnels, for example. Thus, it is currently necessary to perform the object detection by using the parallax information of the stereo camera in the long distance region away from the vehicle as well. When an object existing in the long distance region away from the vehicle is detected by using the parallax information of the stereo camera under the low illuminance environment, noise increases in the long distance region as described above, whereby accuracy of the object detection is decreased. Thus, there is a problem in that a failure may more likely to occur, for example, to the ACC and the pre-crash safety systems.

The present invention has been devised in view of the above-described problem, and an objective thereof is to provide an object detector capable of suppressing any decrease in the accuracy of object detection under the low illuminance environment such as nighttime or in tunnels, for example, as well as capable of suppressing the failure of the ACC, the pre-crash safety systems, and the like.

Solution to Problem

In order to achieve the object, an object detector according to the present invention is an object detector configured to detect an object around a vehicle using a plurality of imaging units, and the object detector includes: a distance information calculation unit configured to calculate distance information to the object around the vehicle from an image captured by the plurality of imaging units; an extraction unit configured to extract at least an object existing in a long distance region away from the vehicle and having a specific color from among objects in the image based on the distance information; and an output unit configured to output the distance information to the object having been extracted by the extraction unit.

Advantageous Effects of Invention

By extracting an object existing in the long distance region away from the vehicle and having a specific color (for example, a preceding vehicle with a brake light (brake lamp), a tail light (tail lamp), an auxiliary brake light (high mounted stop lamp), or the like turned on) from among objects in an image and by outputting distance information to the object that has been extracted, the object detector according to the present invention is capable of suppressing the noise in the long distance region and of suppressing any decrease in the accuracy of the object detection even in a case where the relative distance to the preceding vehicle is measured from the image obtained with the stereo camera under the low illuminance environment such as nighttime or in tunnels, for example, whereby it is possible to suppress a failure of the ACC, the pre-crash safety systems, and the like.

Any problem, configuration, and effect other than the above-described ones are clarified in descriptions of embodiments hereinafter.

DESCRIPTION OF EMBODIMENTS

Hereinafter, embodiments of an object detector according to the present invention are described with reference to the drawings. Hereinafter, descriptions are given mainly on a detection method using the object detector to detect a preceding vehicle ahead of a vehicle under a low illuminance environment such as nighttime or in tunnels.

First Embodiment

Figure 1:
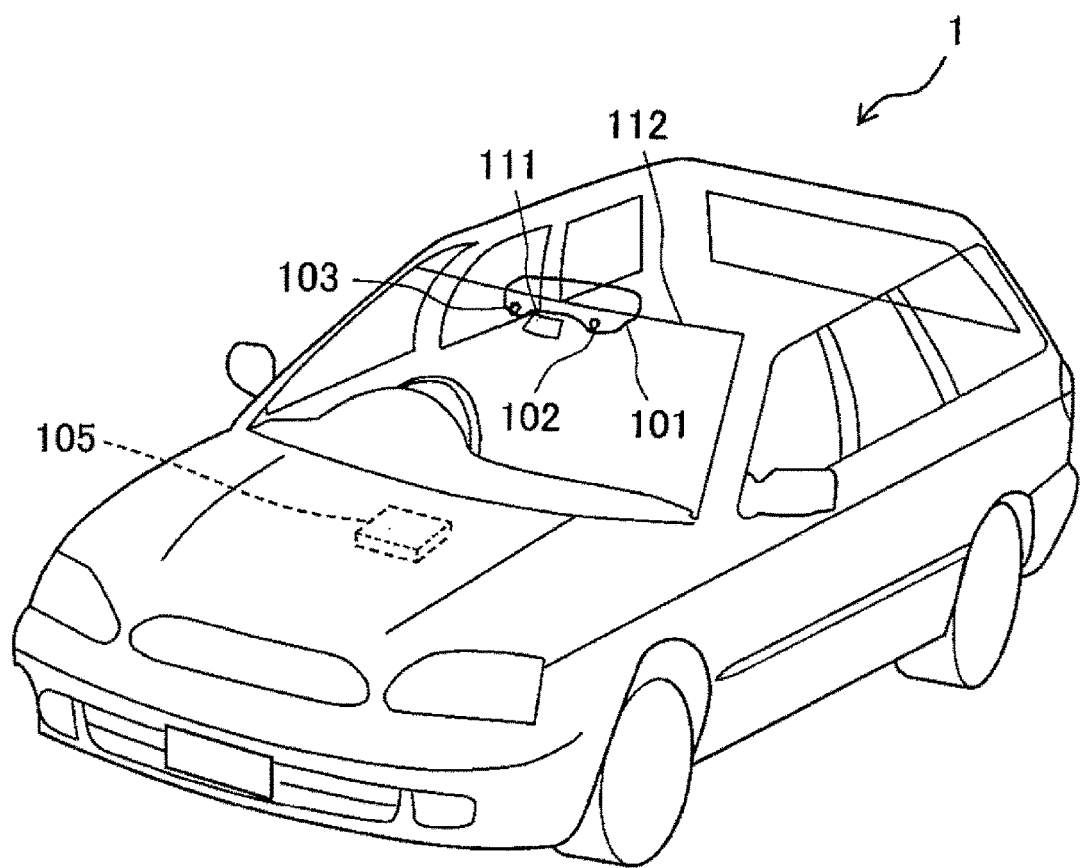
FIG. 1 is an overall perspective view schematically illustrating a vehicle to which an object detector according to a first embodiment of the present invention is applied.

FIG. 1 is a view schematically illustrating a vehicle to which an object detector according to a first embodiment of the present invention is applied.

To a vehicle 1 in FIG. 1, two cameras (imaging units) 102 and 103 are disposed at a predetermined position (for example, a room mirror 101 of the vehicle 1) of the vehicle 1 side by side in a horizontal direction and facing frontward of the vehicle 1. To the vehicle 1, an illuminance sensor 111 that detects illuminance around the vehicle 1 is disposed at a predetermined position (for example, an upper part of a front window 112 of the vehicle 1). The two cameras 102 and 103 and the illuminance sensor 111 are communicably connected to a control unit 110 incorporating an object detector 100 (see FIG. 2), whereby an image obtained by the cameras 102 and 103 and illuminance information detected by the illuminance sensor 111 are transmitted to the control unit 110 through a connecting wire (not illustrated), for example.

Figure 2:
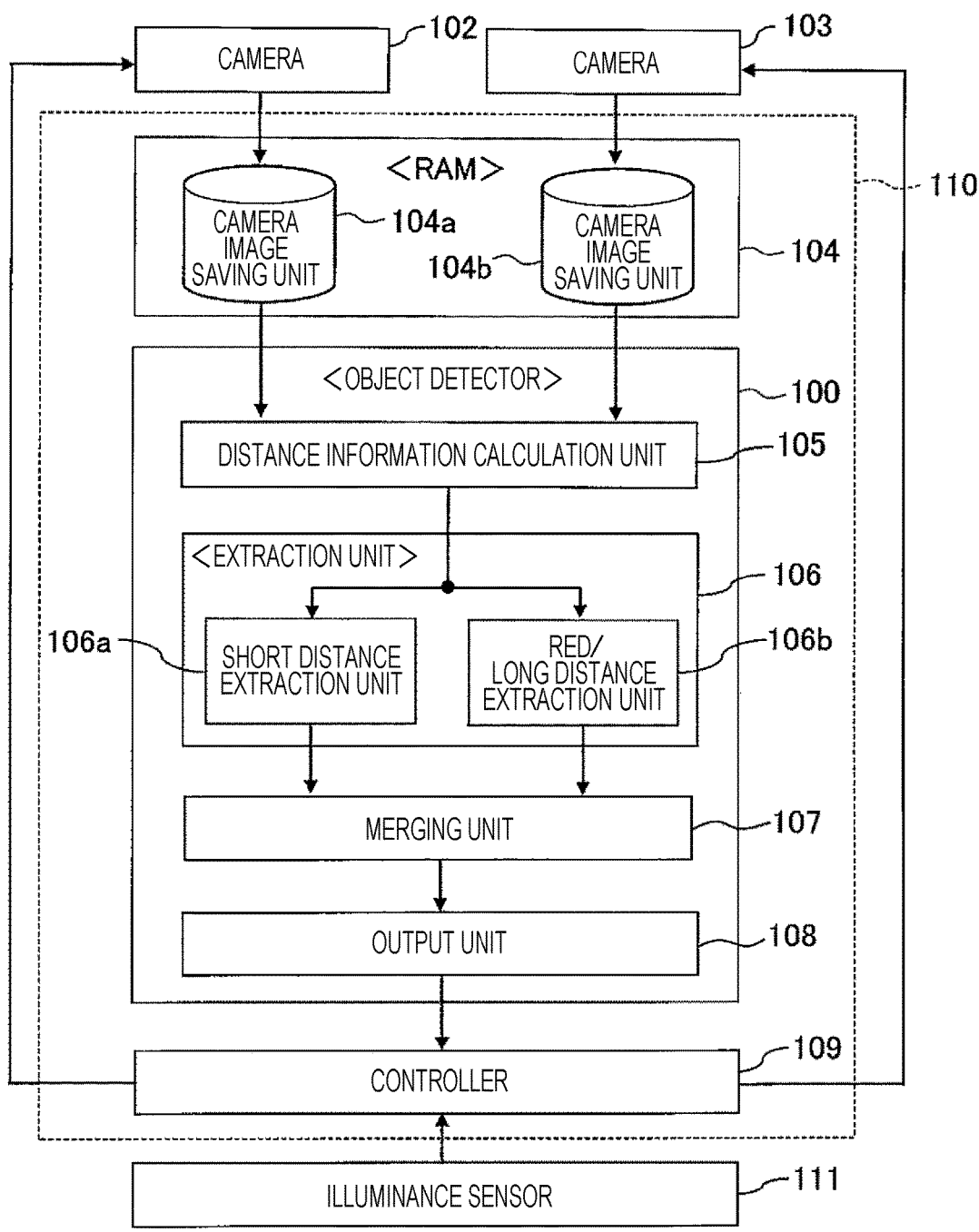
FIG. 2 is an internal configuration diagram illustrating an internal configuration of a control unit illustrated in FIG. 1.

FIG. 2 is a diagram illustrating an internal configuration of the control unit illustrated in FIG. 1. As illustrated, the control unit 110 mainly includes a RAM 104 as an image saving unit, the object detector 100, and a controller 109 as a control unit. The object detector 100 mainly includes a distance information calculation unit 105, an extraction unit 106, a merging unit 107, and an output unit 108.

As described above, the illuminance information around the vehicle 1 detected by the illuminance sensor 111 has been transmitted to the controller 109 of the control unit 110. Based on the illuminance information that has been transmitted, the controller 109 generates a control signal for performing exposure control in which an exposure condition (for example, an exposure value) of each of the cameras 102 and 103 is adjusted. For example, the controller 109 controls each of the camera camera 102 and 103 such that the exposure value is different between a high illuminance environment such as daytime and a low illuminance environment such as nighttime or in tunnels. More specifically, in a case where the controller 109 determines that the vehicle 1 is in the low illuminance environment such as the nighttime or in the tunnels based on the illuminance information detected by the illuminance sensor 111, the controller 109 generates the control signal for adjusting the exposure value of each of the cameras 102 and 103 such that a brake light or a tail light of a preceding vehicle existing in a long distance region away from the vehicle 1 by a predetermined distance to be displayed in red. Then, the controller 109 transmits the control signal to each of the cameras 102 and 103. Note that the exposure value of a camera means a shutter value and a gain value of the camera.

Each of the cameras 102 and 103 adjusts the exposure condition such as the exposure value based on the control signal that has been transmitted from the controller 109 and transmits the image captured with each of the cameras 102 and 103 to each of camera image saving units 104a and 104b of the RAM 104 where the image is stored therein.

Figure 3:
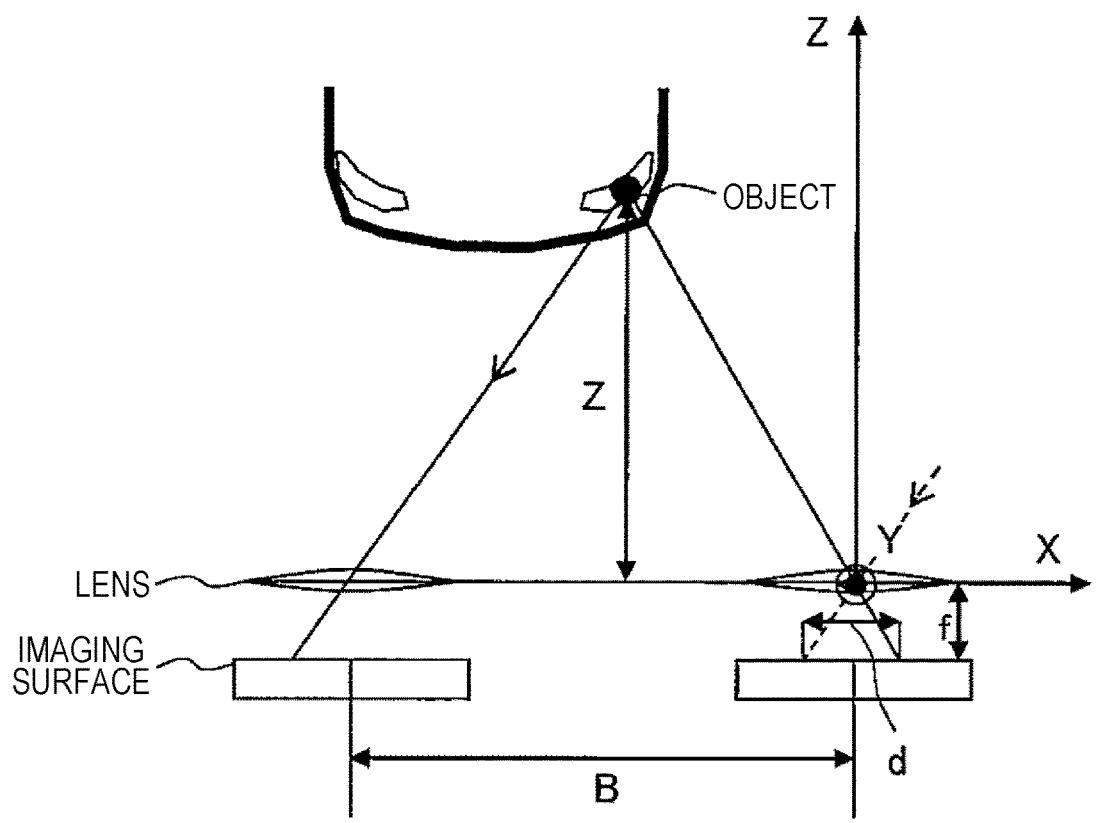
FIG. 3 is a diagram illustrating a principle of a method for calculating distance information using a stereo camera.

The distance information calculation unit 105 of the object detector 100 regularly acquires the image stored in each of the camera image saving units 104a and 104b of the RAM 104, calculates a relative distance between the vehicle and an object such as the preceding vehicle ahead of the vehicle by using parallax information of the same vehicle displayed on the acquired image, and transmits a calculation result to the extraction unit 106. Specifically, as illustrated in FIG. 3, when a baseline length, or a distance between right and left optical axes, is denoted by B, a focal length of a camera is denoted by f, and a parallax on an imaging surface is denoted by d, a relative distance Z to the preceding vehicle is calculated by Formula 1 below based on a similarity ratio of a triangle.

[Formula 1]
$$Z = \frac{B \cdot f}{d} \quad (1)$$

Here, in a method for calculating distance using a stereo camera constituted of the cameras 102 and 103, since the parallax d becomes smaller as the relative distance to the object becomes larger, accuracy of distance measurement of the object in the image decreases in the long distance region away from the vehicle. Thus, a failure may more likely to occur, for example, to an ACC, pre-crash safety systems, and the like.

Accordingly, based on distance information transmitted from the distance information calculation unit 105, the extraction unit 106 extracts, from among objects in the image, at least an object existing in the long distance region away from the vehicle by a predetermined distance and having a red color (specific color) (for example, a preceding vehicle with a control light or a tail light turned on). That is, the extraction unit 106 extracts the object having the red color in the long distance region where the accuracy of the distance measurement may decrease, whereby an increase of noise in the long distance region is suppressed.

Figure 4:
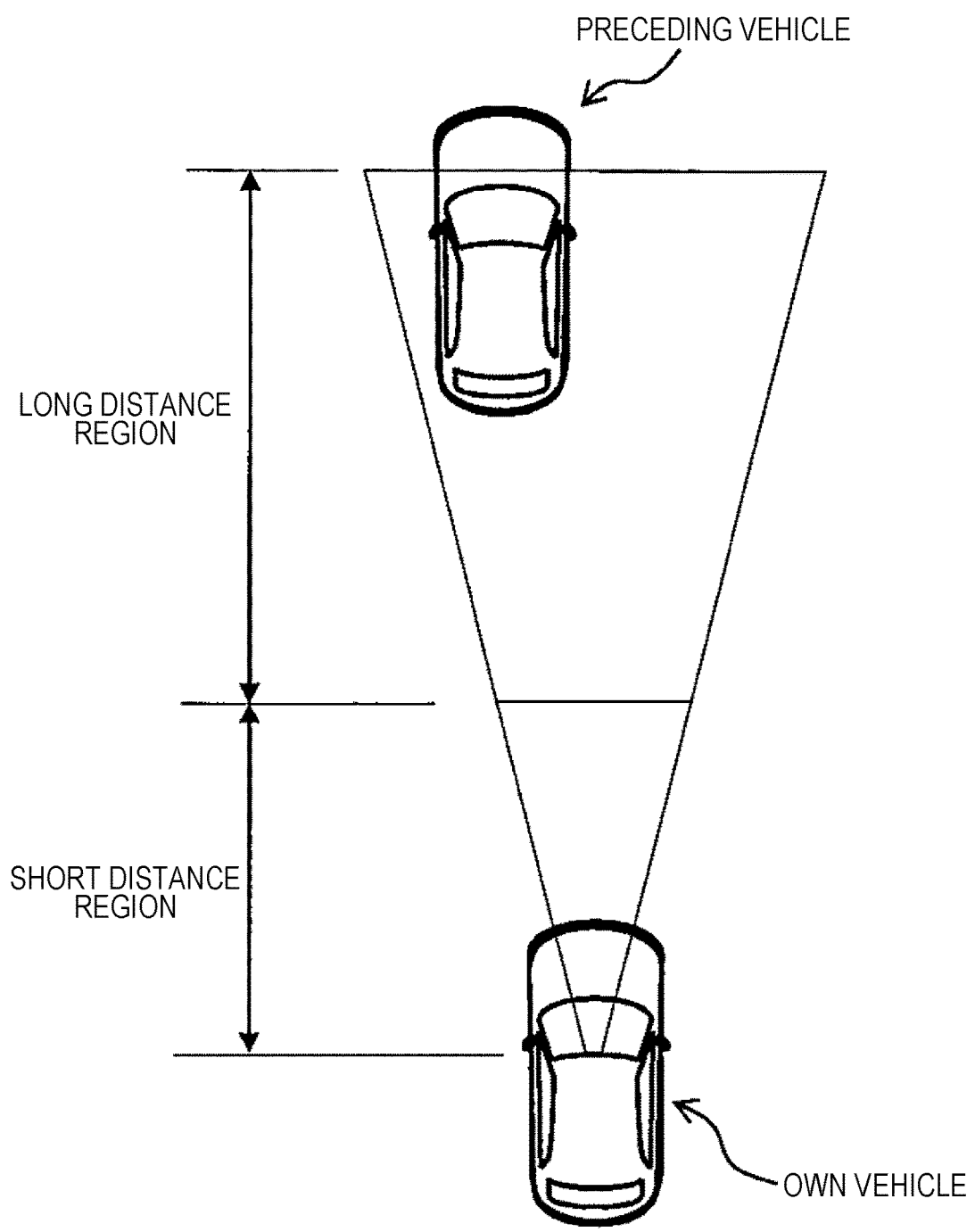
FIG. 4 is a view illustrating a short distance region and a long distance region in an imaging region.

Specifically, the extraction unit 106 includes a short distance extraction unit 106a and a red/long distance extraction unit 106b. Based on the distance information transmitted from the distance information calculation unit 105, the short distance extraction unit 106a extracts, from among the objects in the image captured by the camera, an object existing in a short distance region close to the vehicle. Based on the distance information transmitted from the distance information calculation unit 105, the red/long distance extraction unit 106b extracts, from among the objects in the image captured by the camera, an object existing in the long distance region away from the vehicle by a predetermined distance and having the red color (see FIG. 4). Note that the predetermined distance that defines the short distance region and the long distance region is set as appropriate, for example, according to performance, disposition, and the like of the camera.

The merging unit 107 performs integration processing of the object extracted by the short distance extraction unit 106a and the object extracted by the red/long distance extraction unit 106b by a logical sum (OR) and transmits a processing result thereof to the output unit 108.

Based on the processing result transmitted from the merging unit 107, the output unit 108 outputs the distance information of the object extracted by the short distance extraction unit 106*a* and the object extracted by the red/long distance extraction unit 106*b* to the controller 109. The controller 109 uses the distance information and position information of the object (in particular, a preceding vehicle with a control light or a tail light turned on) within the image output from the object detector 100 in various control applications such as the ACC and the pre-crash safety systems, for example.

Figure 5:
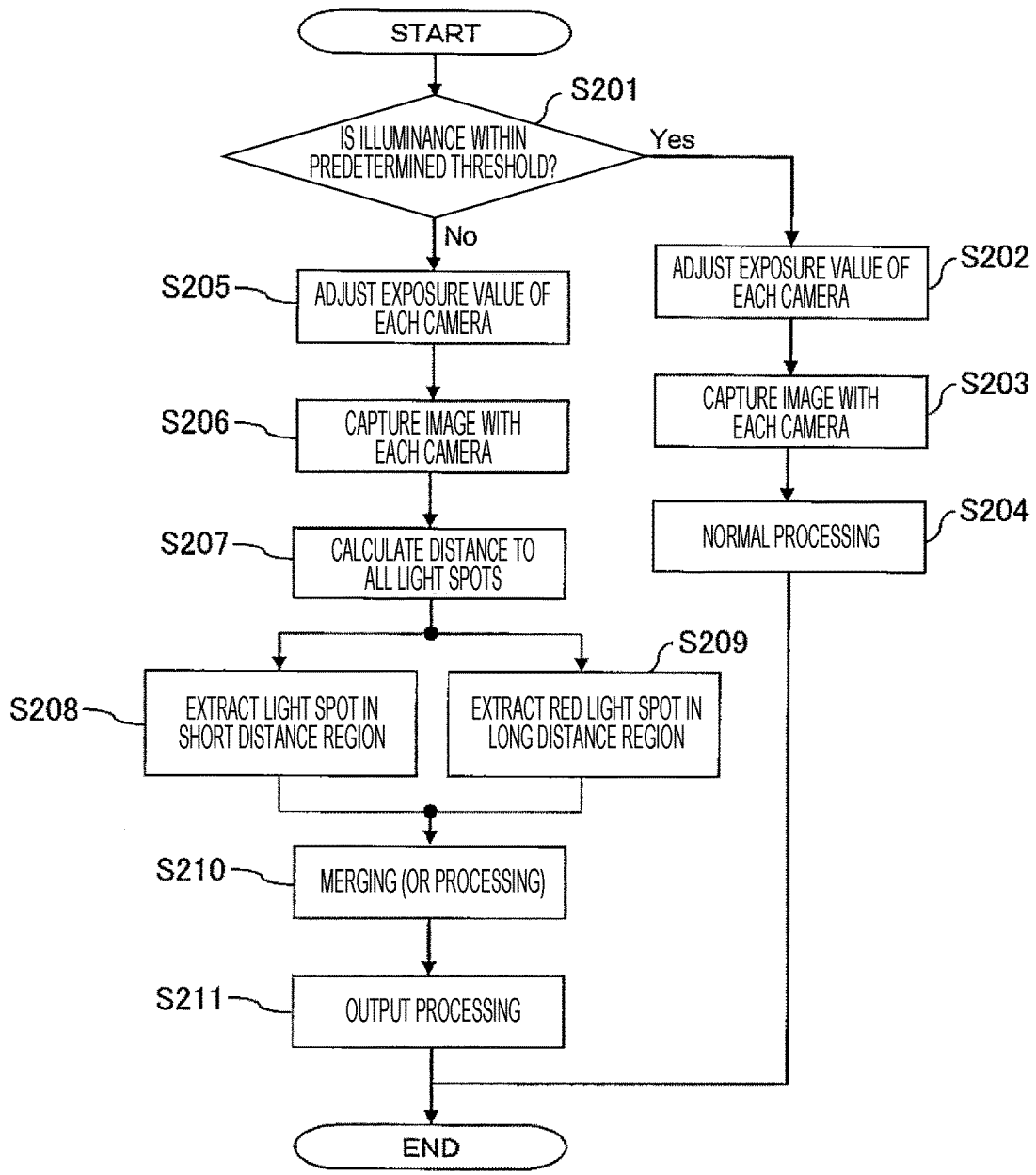
FIG. 5 is a flowchart illustrating a method for detecting an object by an object detector illustrated in FIG. 2.

FIG. 5 is a flowchart illustrating a method for detecting an object by the above-described object detector 100.

As illustrated in FIG. 5, the controller 109 first determines whether or not illuminance around the vehicle is within a predetermined threshold based on the illuminance information detected by the illuminance sensor 111 (S201). In a case where the controller 109 determines that the illuminance around the vehicle is within the predetermined threshold (for example, under a high illuminance environment such as daytime), the controller 109 adjusts the exposure value of each of the cameras 102 and 103 in accordance with the illuminance (S202), and each of the cameras 102 and 103 captures an image around the vehicle (S203). By using the image captured by each of the cameras 102 and 103, the object detector 100 performs normal distance calculation processing (for example, distance calculation processing by switching between distance calculation using parallax information of a stereo camera in a distance region and distance calculation using a monocular camera in the long distance region) to detect the object around the vehicle (S204).

On the other hand, in a case where the controller 109 determines that the illuminance around the vehicle is not within the predetermined threshold (for example, under a low illuminance environment such as nighttime or in tunnels), the controller 109 adjusts the exposure value of each of the cameras 102 and 103 in accordance with the illuminance (S205), and each of the cameras 102 and 103 captures an image around the vehicle (S206). Specifically, the controller 109 adjusts the exposure value of each of the cameras 102 and 103 such that a brake light or a tail light of the preceding vehicle existing in the long distance region away from the vehicle 1 by a predetermined distance are displayed in red, or such that both of the brake light (around 15 w to 60 w) of the preceding vehicle at a proximal end of the long distance region or the tail light (around 5 w to 30 w) of the preceding vehicle at a distal end of the long distance region are displayed in red. Here, the proximal end of the long distance region refers to a position that is the closest to the vehicle in the long distance region (i.e. the farthest position from the vehicle in the short distance region), and the distal end of the long distance region refers to a position that is the farthest from the vehicle in the long distance region (i.e. the farthest position from the vehicle in an imaging region).

Next, the object detector 100 calculates a relative distance between the vehicle and the object such as the preceding vehicle ahead of the vehicle (i.e. all light spots in the image) using the parallax information of the same vehicle displayed on the image that has been captured by each of the cameras 102 and 103 (S207).

Next, based on distance information calculated in S207, the object detector 100 extracts a light spot existing in the short distance region close to the vehicle from among all the light spots in the image (S208) as well as extracts a light spot existing in the long distance region away from the vehicle by the predetermined distance and having the red color from among all the light spots in the image (S209).

Then, the object detector 100 performs the integration processing of the light spot extracted in S208 and the light spot extracted in S209 by the logical sum (OR) (S210), and the object detector 100 outputs distance information of the light spot extracted in S208 and the light spot extracted in S209 to the controller 109 and the like (S211).

In this way, the object detector 100 according to the first embodiment is capable of extracting the object existing in the short distance region close to the vehicle from among the objects in the image captured by the cameras 102 and 103 as well as extracting the object existing in the long distance region away from the vehicle by the predetermined distance and having the red color from among the objects in the image. By outputting the distance information to the object that has been extracted this way, it is possible to extract only the object having the red color (for example, a preceding vehicle with a control light, a tail light, or the like turned on) in the long distance region in which the accuracy of distance measurement may decrease. Thus, even in a case where the relative distance to the preceding vehicle is measured from the image obtained by the stereo camera under the low illuminance environment such as the nighttime or in tunnels, for example, it is possible to suppress an increase of the noise in the long distance region and to suppress any decrease in accuracy of object detection, whereby it is possible to suppress a failure of the ACC, the pre-crash safety systems, and the like.

Second Embodiment

Figure 6:
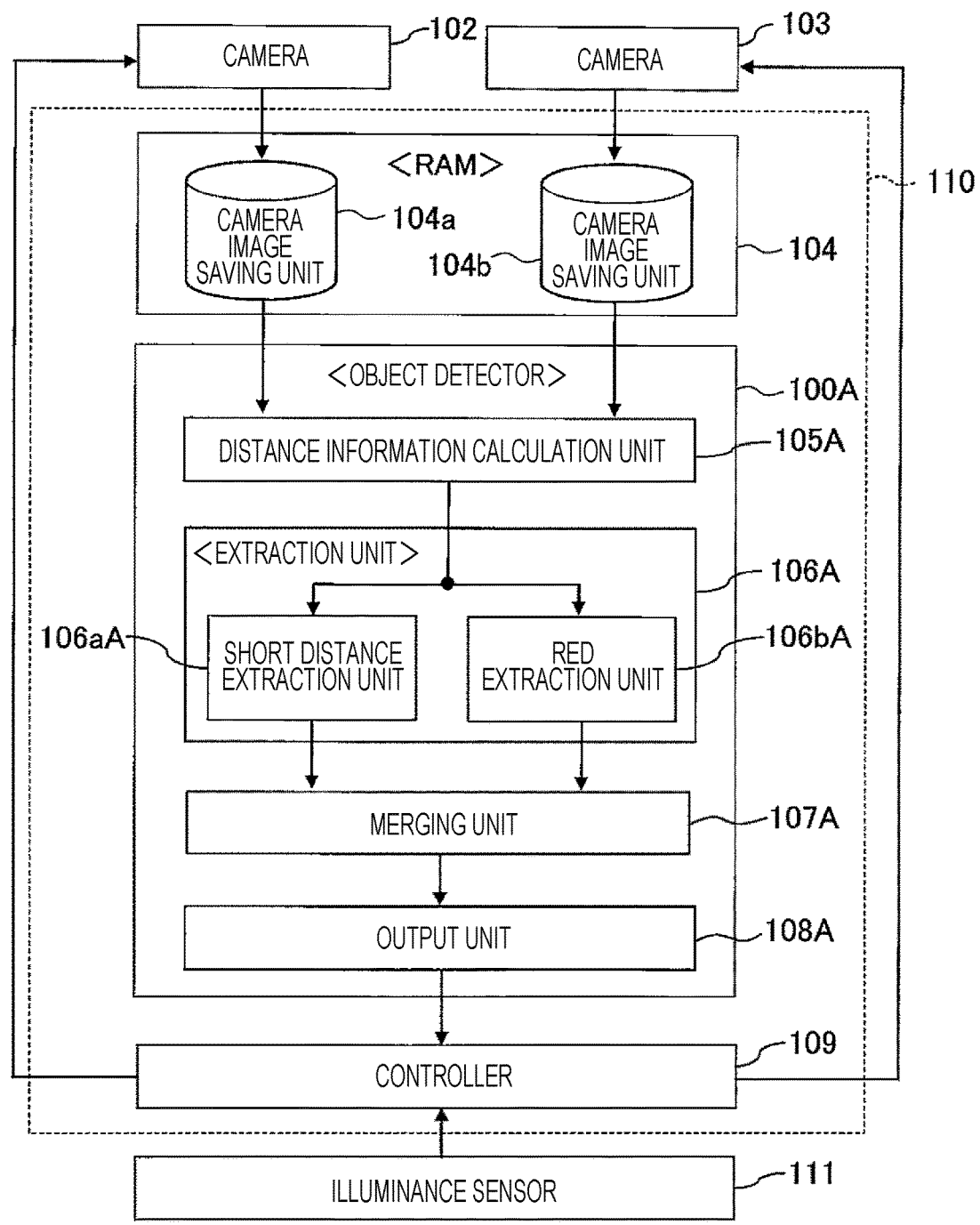
FIG. 6 is an internal configuration diagram illustrating an internal configuration of a control unit in which an object detector according to a second embodiment of the present invention is incorporated.

FIG. 6 is a diagram illustrating an internal configuration of a control unit in which an object detector according to a second embodiment of the present invention is incorporated. An object detector 100A according to the second embodiment has an extraction unit having a different configuration from that of the object detector 100 according to the first embodiment; however, any other configuration is identical to that of the object detector 100 according to the first embodiment. Thus, the configuration identical to that of the object detector 100 according to the first embodiment is denoted by the same reference numeral, and a detailed description thereof is omitted herein.

The object detector 100A according to the second embodiment mainly includes a distance information calculation unit 105A, an extraction unit 106A, a merging unit 107A, and an output unit 108A. The extraction unit 106A includes a short distance extraction unit 106*a*A and a red color extraction unit 106*b*A.

Similar to the first embodiment, based on distance information transmitted from the distance information calculation unit 105A, the short distance extraction unit 106*a*A of the extraction unit 106A extracts an object existing in a short distance region close to a vehicle from among objects in an image captured by a camera. Based on the distance information transmitted from the distance information calculation unit 105A, the red color extraction unit 106*b*A extracts an object having a red color (specific color) (for example, a preceding vehicle with a control light, a tail light, or the like turned on) from among the objects in the image captured by the camera. That is, the red color extraction unit 106*b*A according to the second embodiment extracts the object having the red color from an entire imaging region including the short distance region and a long distance region.

The merging unit 107A performs integration processing of the object extracted by the short distance extraction unit 106*a*A and the object extracted by the red color extraction unit 106bA by a logical sum (OR) and transmits a processing result to the output unit 108A.

Based on the processing result transmitted from the merging unit 107A, the output unit 108A transmits distance information of the object extracted by the short distance extraction unit 106aA and the object extracted by the red color extraction unit 106bA to the controller 109.

Figure 7:
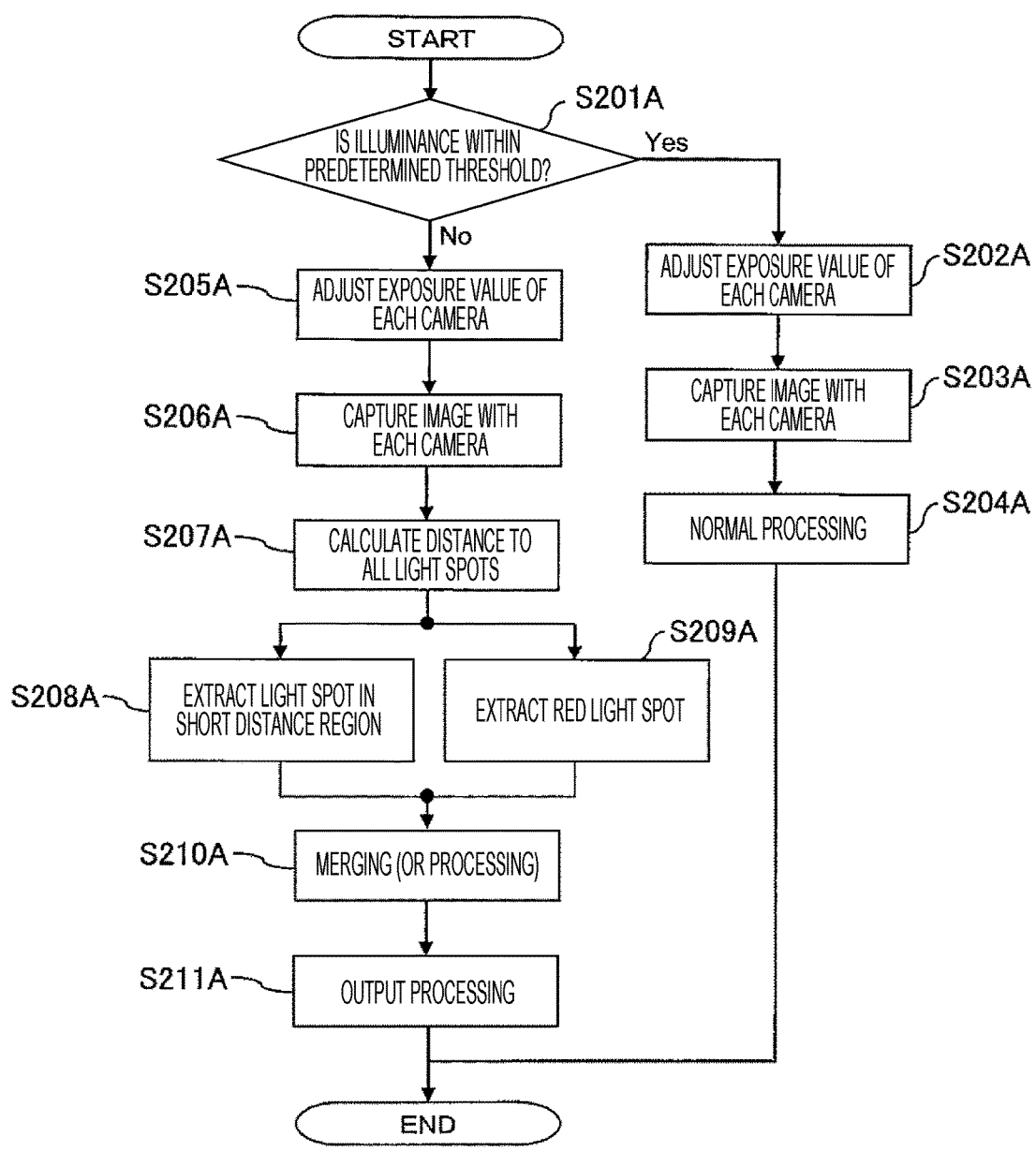
FIG. 7 is a flowchart illustrating a method for detecting an object by the object detector illustrated in FIG. 6.

FIG. 7 is a flowchart illustrating a method for detecting an on object by the above-described object detector 100A.

Similar to the first embodiment, as illustrated in FIG. 7, the controller 109 first determines whether or not illuminance around the vehicle is within a predetermined threshold based on illuminance information detected by the illuminance sensor 111 (S201A). In a case where the controller 109 determines that the illuminance around the vehicle is within the predetermined threshold (for example, under a high illuminance environment such as daytime), by using an image captured by each of the cameras 102 and 103, the object detector 100A performs normal distance calculation processing (for example, distance calculation processing by a switching between distance calculation using parallax information of a stereo camera in the short distance region and distance calculation using a monocular camera in the long distance region) to detect the object around the vehicle (S202A to S204A).

On the other hand, in a case where the controller 109 determines that the illuminance around the vehicle is not within the predetermined threshold (for example, under a low illuminance environment such as nighttime or in tunnels), the controller 109 adjusts the exposure value of each of the cameras 102 and 103 in accordance with the illuminance (S205A), and each of the cameras 102 and 103 captures an image around the vehicle (S206A). Specifically, the controller 109 adjusts the exposure value of each of the cameras 102 and 103 such that a brake light or a tail light of the preceding vehicle existing in the long distance region away from the vehicle 1 by a predetermined distance are displayed in red, or such that the brake light of the preceding vehicle at a proximal end of the long distance region and the tail light of the preceding vehicle at a distal end of the long distance region are displayed in red.

Next, the object detector 100A calculates a relative distance between the vehicle and the object such as the preceding vehicle ahead of the vehicle (i.e. all light spots in the image) using the parallax information of the same vehicle displayed on the image that has been captured by each of the cameras 102 and 103 (S207A).

Next, based on distance information calculated in S207A, the object detector 100A extracts a light spot existing in the short distance region close to the vehicle from among all the light spots in the image (S208A) as well as extracts a light spot having the red color (light spot corresponding to a control light, a tail light, or the like of the preceding vehicle) from among all the light spots in the image (S209A).

Then, the object detector 100A performs the integration processing of the light spot extracted in S208A and the light spot extracted in S209A by the logical sum (OR) (S210A). Then, the object detector 100A outputs distance information of the light spot extracted in S208A and the light spot extracted in S209A to the controller 109 and the like (S211A).

In this way, by using the object detector 100A according to the second embodiment is capable of extracting the object existing in the short distance region close to the vehicle from among the objects in the image captured by the cameras 102 and 103 as well as extracting the object having red color from among the objects in the image. By integrating the objects extracted this way and by outputting the distance information to the objects, similar to the object detector 100 of the first embodiment, it is possible to extract only the object having the red color (for example, a preceding vehicle with a control light, a tail light, or the like turned on) in the long distance region in which accuracy of distance measurement may decrease. Furthermore, by extracting the object having the red color in the imaging region by the red color extraction unit 106bA of the extraction unit 106A of the object detector 100A, compared to when extracting the object existing in the long distance region away from the vehicle by a predetermined distance and having the red color, for example, it is possible to simplify processing performed in the extraction unit 106A.

Third Embodiment

Figure 8:
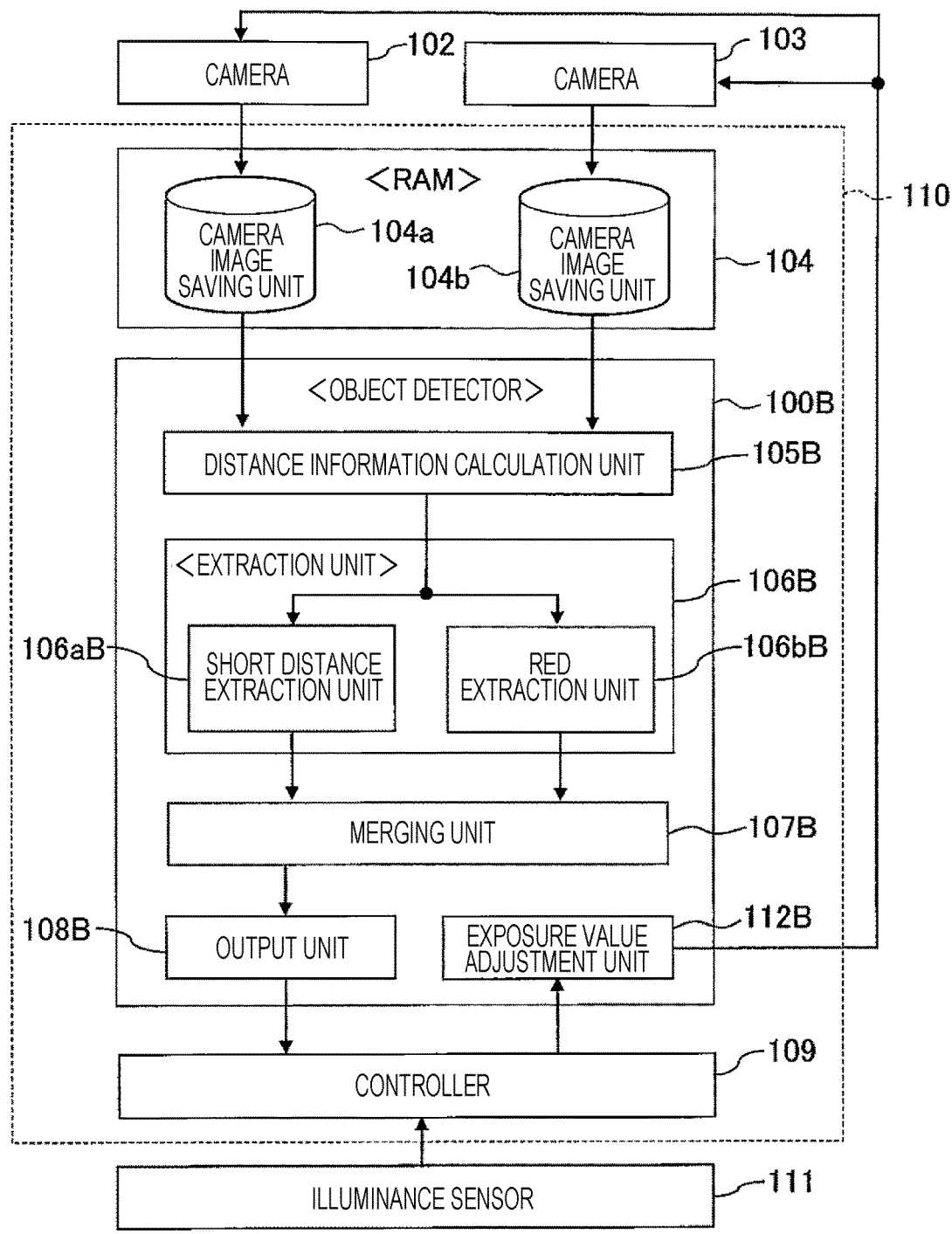
FIG. 8 is an internal configuration diagram illustrating an internal configuration of a control unit in which an object detector according to a third embodiment of the present invention is incorporated.

FIG. 8 is a diagram illustrating an internal configuration of a control unit in which an object detector according to a third embodiment of the present invention is incorporated. An object detector 100B according to the third embodiment is different from the object detector 100A according to the second embodiment in that the object detector has an exposure value adjustment function; however, any another configuration is identical to that of the object detector 100A according to the second embodiment. Thus, the configuration identical to that of the object detector 100A according to the second embodiment is denoted by the same reference numeral, and a detailed description thereof is omitted herein.

The object detector 100B according to the third embodiment mainly includes a distance information calculation unit 105B, an extraction unit 106B, a merging unit 107B, an output unit 108B, and an exposure value adjustment unit 112B that generates a control signal for performing exposure control that adjusts an exposure condition (for example, an exposure value) of each of the cameras 102 and 103.

The exposure value adjustment unit 112B acquires illuminance information around a vehicle that is output from the illuminance sensor 111 through the controller 109 or directly from the illuminance sensor 111. Based on the acquired illuminance information, the exposure value adjustment unit 112B generates the control signal for performing the exposure control of each of the cameras 102 and 103 and transmits the control signal to each of the cameras 102 and 103.

Each of the cameras 102 and 103 adjust the exposure condition such as the exposure value based on the control signal that has been transmitted from the exposure value adjustment unit 112B and transmits the image captured by each of the cameras 102 and 103 to each of the camera image saving units 104a and 104b of the RAM 104 where the image is stored therein. By using the image stored in each of the camera image saving units 104a and 104b, the object detector 100B outputs distance information to an object in the image to the controller 109.

Note that in the above-described first to third embodiments, a form has been described in which the controller or the exposure value adjustment unit adjusts the exposure value of each of the cameras based on the illuminance around the vehicle detected by the illuminance sensor; however, the exposure value of each of the cameras may also be set by an user and the like in advance such that a brake light or a tail light of a preceding vehicle existing in a long distance region away from the vehicle by a predetermined distance under a low illuminance environment such as nighttime or in tunnels, for example, are displayed in red.

Furthermore, in the above-described first to third embodiments, to detect the preceding vehicle ahead of the vehicle under the low illuminance environment such as nighttime or in tunnels, a form has been described in which an object having a red color corresponding to a control light or the tail light is extracted from among objects in the image; however, a color used for extracting an object to be detected in the long distance region may be changed as appropriate according to the object to be detected.

Note that the present invention is not to be limited to the above-described first to third embodiments and may include various modifications. For example, the above-described first to third embodiments are described in detail so as to make the present invention understandable, whereby the present invention is not necessarily limited to an embodiment having all of the configurations described above. It is also possible to replace a part of a configuration of one embodiment with a configuration of another embodiment or to add the configuration of the other embodiment to the configuration of one embodiment.

A part of the configuration of each of the embodiments may also be added with another configuration, be deleted, or be replaced with another configuration.

A part of or all of each of the above-described configuration, function, processing unit, processing means, and the like may be achieved by hardware by designing with an integrated circuit, for example. Each of the above-described configuration, function, and the like may also be achieved by software by using a processor that interprets and executes a program for achieving each of the functions. Information such as a program, a table, and a file for achieving each of the functions may be placed in a storage device such as a memory, a hard disk, and a solid state drive (SSD) or in a recording medium such as an IC card, an SD card, and a DVD.

Note that a control line and an information line that are necessary for the purpose of description are illustrated only, whereby not all of the control lines and the information lines are necessarily illustrated. It may be considered that almost all configurations are connected with each other in actuality.

REFERENCE SIGNS LIST

1: vehicle
100: object detector
102, 103: camera (imaging unit)
104: RAM
104a, 104b: camera image saving unit
105: distance information calculation unit
106: extraction unit
106a, 106aA: short distance extraction unit (first partial extraction unit)
106b: red/long distance extraction unit (second partial extraction unit)
106bA: red color extraction unit (second partial extraction unit)
107: merging unit
108: output unit
109: controller
110: control unit
111: illuminance sensor
112B: exposure value adjustment unit

The invention claimed is:

1. An object detector configured to detect objects around a vehicle using a plurality of cameras, the object detector comprising:
a controller that is configured to
calculate a first distance information from the vehicle to the objects around the vehicle from an image captured by the plurality of cameras;
extract a first object around the vehicle existing in a first distance region, that is closer to the vehicle than a second distance region, from among objects in the image, and
extract a second object around the vehicle existing in the second distance region and having a specific color from among the objects in the image,
perform integration processing by conducting a logical sum of first and second extracted objects around the vehicle, and
output a second distance information, using a result of the logical sum, wherein
distances that define the first distance region and the second distance region are predetermined based on a performance characteristic of the plurality of cameras.

2. The object detector according to claim 1, wherein
an exposure value of the plurality of cameras is adjusted such that a brake light and a tail light of a preceding vehicle in the first distance region are displayed in the specific color.

3. The object detector according to claim 1, wherein
the first distance region has a proximal end and distal end, the proximal end being closer to the vehicle than the distal end, and
an exposure value of the plurality of cameras is adjusted such that a brake light of a preceding vehicle at the proximal end of the first distance region and a tail light of the preceding vehicle at the distal end of the first distance region are displayed in the specific color.

4. The object detector according to claim 1, wherein
an exposure value of the plurality of cameras is adjusted based on illuminance around the vehicle.

5. The object detector according to claim 1, wherein the controller is also configured to adjust an exposure value of the plurality of cameras such that a brake light or a tail light of a preceding vehicle in the first distance region is displayed in the specific color.

6. The object detector according to claim 1, wherein
the first distance region has a proximal end and distal end, the proximal end being closer to the vehicle than the distal end, and the controller is also configured to adjust an exposure value of the plurality of cameras such that a brake light of a preceding vehicle at the proximal end of the first distance region or a tail light of the preceding vehicle at the distal end of the first distance region are displayed in the specific color.

7. The object detector according to claim 1, wherein the controller is also configured to adjust an exposure value of the plurality of cameras based on illuminance around the vehicle.

* * * * *